UNITED STATES PATENT OFFICE.

CARLETON ELLIS, OF MONTCLAIR, NEW JERSEY, ASSIGNOR TO ELLIS-FOSTER CO., A CORPORATION OF NEW JERSEY.

CATALYZER FOR OXIDIZING REACTIONS.

1,314,952.   Specification of Letters Patent.   Patented Sept. 2, 1919.

No Drawing.   Application filed June 26, 1916.   Serial No. 105,881.

*To all whom it may concern:*

Be it known that I, CARLETON ELLIS, a citizen of the United States, and a resident of Montclair, in the county of Essex and State of New Jersey, have invented certain new and useful Improvements in Catalyers for Oxidizing Reactions, of which the following is a specification.

This invention relates to a catalyzer for use in making sulfur trioxid by the contact process, which catalyzer can also be used for other purposes, and constitutes a modification of the showing of allowed applications Serial Nos. 37,243 and 103,556 and Patents 1,204,141; 1,204,142 and 1,204,143.

According to the said prior cases material comprising chromium oxid existing largely in the higher state of oxidation combined with or associated with a heavy metal element (such as tin, antimony, and others, of which the oxids have the power, in a heated state, of absorbing large quantities of sulfur dioxid), is formed into masses, preferably porous, granules, blocks, plates, grains and the like, for use as a catalyzer.

According to the present invention, these are impregnated or coated with a rare metal catalyzer such as those of the platinum group of metals and particularly platinum to produce mixed catalytic material containing preferably a very low percentage, preferably not exceeding about one one-hundredth of one per cent. of platinum material.

While as stated in the applications and patents referred to, the chromium material may be associated with a variety of heavy metals or their compounds, in the present application the production of the active base material is more particularly described, at least illustratively, with reference to tin chromate or tin chromium compositions.

Catalytic material may be prepared in accordance with the present invention in the following manner:—

400 grs. of hydrated tin chlorid are dissolved in 150 grs. of ordinary hydrochloric acid and this solution or mixture is added to a solution containing 1,080 grs. of ammonium dichromate. The mixture is heated to dryness and in drying down the mass takes on a peculiar colloidal condition and turns black in color appearing very much like thick tar.

Thin layers of this tar-like material are heated on a hot plate until transformed from a colloidal viscid plastic into a porous vesiculated dry slag-like mass. This product is broken up into fragments and is screened on a twelve mesh sieve. The fragments remaining on the sieve are then baked to expel fumes of ammonium chlorid and also to harden the fragments or granular masses until they have acquired sufficient physical strength to resist a considerable crushing load. This material is then treated with a solution of platinum or other similar agent including the compounds of palladium, osmium, ruthenium and the like to impregnate or coat the particles, fragments or granules. For example, to 100 grs. of the above product .013 grs. of platinum chlorid in solution is added and then a sufficient amount of ammonia to form ammonium chlorid from the chlorin of the platinum salt. An excess of ammonia ordinarily does no harm. The platinized material is heated until fumes of ammonium chlorid cease to be given off. The catalyzer contains .0095% of platinum.

In producing sulfur trioxid, this catalyzer is placed in a catalyzer chamber or converter and is subjected to a current of sulfur diozid and air or oxygen at temperature ranging from 750 to 1000° F. bringing about conversion of the sulfur dioxid to a large extent at least into sulfur trioxid which may be absorbed in water or hydrated sulfuric acid.

A catalytic chamber of, for example, cylindrical shape and containing trays on which the catalyzer is placed may be charged in this way, namely; in the lower trays granules of the tin-chromium mixture or compound without platinum are placed, while in the upper trays, the tin-chromium material incorporated with platinum is placed and the arrangement of entering gases is such that the fresh mixture of sulfur dioxids and air comes in contact with the tin-chromium catalyzer and the reaction is finished to the required degree in the presence of the tin - chromium - platinum catalyzer. Or the flow of gases and the location of the catalyzer in the trays may be reversed. The sulfur dioxid and air mixture may enter from the top and come in contact with the tin-chromium compound at that point, later coming in contact with the platinized material.

Instead of having the catalytic material all in one container or converter the reaction may be inaugurated in a converter containing tin-chromium material, the sulfur trioxid being absorbed and the residual sulfur dioxid and air passed over platinized tin-chromium material in a second converter. The temperature in the latter converter may if desired be somewhat lower than that in the first converter as platinum is more effective at a temperature of from 50 to 100° lower than the tin chromium material. The latter usually works to best advantage around 850 to 900° F.

The chromium-containing catalyzers, broadly (*i. e.*, not platinized), and the use thereof in the manufacture of sulfur trioxid, are not claimed herein, but in the applications and patents above listed.

What I claim is:—

1. An oxidizing catalyst adapted for converting sulfur dioxid into sulfur trioxid in the presence of air which comprises granules containing tin and chromium oxids, said granules being associated with a finely divided metal of the platinum group.

2. An oxidizing catalyst adapted for converting sulfur dioxid into sulfur trioxid in the presence of air which comprises platinized granules containing chromium oxids.

3. An oxidizing catalyst adapted for converting sulfur dioxid into sulfur trioxid in the presence of air which comprises platinized granules containing tin and chromium oxids.

4. An oxidizing catalyst adapted for converting sulfur dioxid into sulfur trioxid in the presence of air which comprises platinized granules containing tin chromate.

5. A catalyzer adapted for use as a contact material in oxidizing reactions and specifically adapted for the conversion of sulfur dioxid in the presence of air into sulfur trioxid which comprises a platinized compound of chromium and a metal, the oxid of which is capable in a heated condition, of absorbing large amounts of $SO_2$.

6. A catalyzer adapted for use as a contact material in oxidizing reactions and specifically adapted for the oxidation of sulfur dioxid into sulfur trioxid which comprises platinized tin chromium material baked to stand a substantial crushing load.

7. A catalyzer adapted for use as a contact material in oxidizing reactions and specifically adapted for the oxidation of sulfur dioxid into sulfur trioxid which comprises platinized vesiculated tin chromate.

8. A catalyzer adapted for use as a contact material in oxidizing reactions and specifically adapted for the oxidation of sulfur dioxid into sulfur trioxid which comprises platinized vesiculated granules of tin-chromium oxids.

9. A catalyst for use in oxidation of sulfur dioxid, which comprises a plurality of metal oxids associated with a metal of the platinum group, at least one of such metal oxids being capable, at temperatures of 750 to 1000° F., of absorbing relatively large amounts of sulfur dioxid.

CARLETON ELLIS.